US007683842B1

(12) United States Patent
Engel et al.

(10) Patent No.: US 7,683,842 B1
(45) Date of Patent: Mar. 23, 2010

(54) DISTRIBUTED BUILT-IN TEST AND PERFORMANCE MONITORING SYSTEM FOR ELECTRONIC SURVEILLANCE

(75) Inventors: Richard Engel, Ridge, NY (US); Emery Korpi, Syosset, NY (US)

(73) Assignee: Advanced Testing Technologies, Inc., Hauppauge, NY (US)

( * ) Notice: Subject to any disclaimer, the term of this patent is extended or adjusted under 35 U.S.C. 154(b) by 170 days.

(21) Appl. No.: 12/049,781

(22) Filed: Mar. 17, 2008

Related U.S. Application Data

(60) Provisional application No. 60/940,807, filed on May 30, 2007.

(51) Int. Cl.
*G01R 29/10* (2006.01)
(52) U.S. Cl. ........................ 343/703; 342/170
(58) Field of Classification Search .................. 343/703
See application file for complete search history.

(56) References Cited

U.S. PATENT DOCUMENTS

| 4,145,692 A | * | 3/1979 | Armstrong et al. ........... 342/173 |
| 5,745,382 A | * | 4/1998 | Vilim et al. .................... 706/16 |
| 7,171,157 B2 | * | 1/2007 | Lee ................................ 455/8 |
| 2008/0204554 A1 | * | 8/2008 | Hubmer et al. ............. 348/143 |

FOREIGN PATENT DOCUMENTS

GB          2 149 624        *  6/1985

* cited by examiner

*Primary Examiner*—Hoang V Nguyen
(74) *Attorney, Agent, or Firm*—Brian Roffe

(57) ABSTRACT

A distributed test system for implementing enhanced BIT (Built-In-Test) within an ESM (Electronic Surveillance Monitoring) or RF receiver system. The distributed test system includes a system processor, a programmable RF source element or other comparable test signal generating arrangement, and switched path coupled elements and various measurement elements, each embedded at strategic locations within the ESM system so as to effect maximum path coverage and test benefit.

20 Claims, 9 Drawing Sheets

DISTRIBUTED BUILT-IN TEST AND PERFORMANCE MONITORING SYSTEM FOR ELECTRONIC SURVEILLANCE

CROSS REFERENCE TO RELATED APPLICATION

This application claims priority under 35 U.S.C. §119(e) of U.S. provisional patent application Ser. No. 60/940,807 filed May 30, 2007, incorporated by reference herein.

FIELD OF THE INVENTION

The present invention relates generally to the field of automatic test systems for testing electronic radio frequency (RF) signals, and more particularly, to automatic test equipment for evaluating path response within an Electronic Surveillance Monitoring (ESM) system using a mix of frequency domain and time domain analyses.

BACKGROUND OF THE INVENTION

Automatic test equipment for testing the performance of RF communications systems, radar systems and other RF-related distribution components has been available for a number of years and is well established. A mix of scalar and vector network analyzers can be used to obtain a variety of S-parameter $S_{11}$, $S_{12}$, $S_{21}$, $S_{22}$ measurements in addition to phase and delay measurements on RF components.

Performing a swept frequency response on an RF distribution chain is of paramount importance when testing an ESM system. Specifically, a manufacturer or end user will specify the minimum and/or maximum insertion loss $S_{21}$ allowed for a particular path to insure proper system performance.

An ESM system encompasses different types of systems. One type of system is electronic support measures which is geared towards supporting EW (Electronic Warfare). It is essentially scanning the radio spectrum but the surveillance is in a different context.

A typical ESM system is usually subjected to periodic calibration involving weeks of rigorous testing in order to guarantee continued system compliance with manufacturer's and/or end user's parameters. Manual testing of an ESM system has proven to be a long and cumbersome effort and prone to operator error. Automation of the testing process reduces the effort involved as well as reduces the potential for operator error. Conventional test equipment is typically used to conduct these measurements. Once an ESM system has been subjected to, and successfully passed a thorough battery of tests, it is ready for deployment. Herein lies the weakness of the current test equipment and test systems approach.

Once deployed, the typical ESM system is subjected to harsh physical and environmental elements. Even with the best of care, components within the ESM system are subject to degradation and/or failure, for example, when exposed to extreme operating conditions. The absence of some form of built-in-testing (BIT) or periodic performance monitoring system often results in an ESM system whose performance parameters can be considered questionable at any given point after deployment. As a result, the need for some form of embedded automatic test system becomes a necessity in order to maintain accurate and repeatable performance of the ESM system. In this connection, embedding the automatic test system with the ESM system may be considered to be situating the automatic test system such that it is readily available for testing the ESM system at its operating site without requiring the ESM system to be moved, for example, to a special testing facility.

OBJECTS AND SUMMARY OF THE INVENTION

It is an object of the present invention to provide a distributed built-in-test and performance monitoring system and method for electronic surveillance monitoring systems.

In order to achieve this object and others, in one embodiment of the present invention, a distributed test system is provided which includes one or more distribution paths or RF chains in an antenna-containing structure, an embedded antenna injection switching arrangement for injecting or directing signals into an RF chain, an embedded programmable RF source, a plurality of embedded RF couplers within each applicable distribution path or RF chain, a swept tuned measurement receiver, a time domain digitizer, a means or system for switching between the plurality of embedded couplers and a system processor to coordinate all processes and evaluate measurement data.

In one embodiment, the embedding of the particular components in the antenna-containing structure means that the components are arranged in the same housing as the antenna(s). For example, in some cases, the antenna(s) are arranged in an antenna radome in which case, the components may be arranged therein, e.g., a portion of the antenna injection switching arrangement. In another case, the antenna-containing structure is a submarine having an antenna radome but all of the components of the distributed test system are not necessarily, and preferably are not, arranged in the antenna radome, except for some elements of the antenna injection switching arrangement. Rather, the components would be arranged or installed elsewhere in or on the submarine, e.g., embedded at different points throughout the submarine. In this regard, the invention is also directed to a method and system for retrofitting existing ESM systems and thus it is expected that the retrofitting process will entail modification, retrofit and/or replacement of various existing assemblies and components in the antenna-containing structure as well as the addition of some new assemblies and equipment.

The embedded antenna injection switching arrangement in accordance with the present invention is preferably used to route an external RF signal from a test source, such as the programmable RF source, and inject it into an antenna path within the antenna radome, for example, between the antenna and an amplifier in the RF chain. The level of the injected signal is compatible with the signal(s) present during normal operation. Embedded antenna injection switching permits the application of a signal having defined properties (frequency, level, modulation, etc.) to the front end of the ESM system while isolating the signal present at the antenna to effect internal testing of the ESM system. The signal present at the antenna thus does not pass through to the signal processing element of the RF chain while the injection switching is configured to inject a test signal into the antenna path.

In this manner, a BIT or periodic performance monitoring system is provided which can be periodically used to field test an ESM system, for example, when the performance parameters of the ESM system are considered questionable. Once the distributed test system in accordance with the invention is utilized, accurate and repeatable performance of the ESM system can be maintained, without requiring use of testing facilities external of the antenna-containing structure.

A method in accordance with the invention is also disclosed for testing electronic surveillance monitoring systems including an antenna-containing structure including an antenna radome, one or more RF chains, each including an antenna, an amplifier and a signal processing element arranged to receive signals from the antenna through the amplifier. At least the antenna and the amplifier of each RF chain are preferably housed in the antenna radome. The method involves arranging a test signal generating arrangement in or on the antenna-containing structure, generating test signals by means of the test signal generating arrangement, and directing or injecting the test signals into one or more of the RF chains within the antenna radome.

The test signal generating arrangement may be, but is not required to be, arranged partially or entirely in the antenna radome or embedded in the antenna radome. In one embodiment, the test signal generating arrangement is a programmable RF source which, although it can be situated within the antenna radome, is situated outside the antenna radome, but otherwise is in or on the antenna-containing structure. The antenna radome would thus primarily house the antenna(s) and low noise amplifiers (LNAs), along with elements which facilitate that directing or injecting of the test signals into the RF chains.

In one embodiment, a switching arrangement is also arranged at least partially, and possibly entirely embedded, in the antenna radome for selectively enabling signals received by the antenna of each RF chain to be directed to the signal processing element of each RF chain and enabling test signals generated by the test signal generating arrangement to be directed into each RF chain. Typically, the switching arrangement would be entirely arranged in the antenna-containing structure, with only some portions thereof actually in the antenna radome.

The test signal generating arrangement and the switching arrangement are controlled, e.g., by a control system which may include a system processor, to alternately cause the amplifier of each RF chain to receive signals from the antenna or receive test signals from the test signal generating arrangement. In the latter case, the test signals may be directed into each RF chain in advance of the amplifier in a signal flow path from the antenna to the signal processing element of the RF chain.

When a plurality of RF chains are present in the antenna radome, the injection of test signals may involve arranging switches in the RF chains and controlling the switches via control signals to cause test signals on a first RF chain to be directed into an amplifier of a second RF chain while isolating the antenna of the second RF chain from the amplifier of the second RF chain. Thus, test signals originating on one RF chain are directed to another RF chain.

In one embodiment, the test signal generating arrangement comprises a programmable RF source, and an RF switching arrangement that is coupled to the RF source and each RF chain. The RF switching arrangement is controlled to enable signals from the RF source to be directed into each RF chain in a direction toward the antenna of each chain and away from the signal processing element of the RF chain (upstream). Appropriate positioning of the RF source can also allow the RF switching arrangement to be controlled to enable signals from the RF source to be directed onto each RF chain in a direction toward the signal processing element of thereof and away from the antenna thereof (downstream). This can be used to provide test signals to the signal processing elements to test their response to the same.

Signals on each RF chain may be monitored by means of a monitoring arrangement arranged in connection therewith. Specifically, in one embodiment, the monitoring arrangement includes RF couplers associated with each RF chain, and preferably arranged further down in the signal processing chain outside of the antenna radome, but still in or on the antenna-containing structure. Several advantages are provided by such an arrangement, one of which is elimination of the need for additional cabling, thereby allowing the existing interface to be used. Another advantage of this arrangement is that a larger segment (i.e., cabling and/or waveguide) of the existing system is tested. Instead of or in addition to RF couplers, switches may be used for signal injection and monitoring. The monitoring arrangement also includes a swept tuned measurement receiver and a time domain digitizer, or other signal measuring systems. An RF switching arrangement may be provided to switch between the RF couplers to direct measurement signals from the RF couplers to the swept tuned measurement receiver and the time domain digitizer.

A single system processor may be coupled to the switching arrangement, the test signal generating arrangement, the RF switching arrangement, the measurement receiver and the time domain digitizer to coordinate testing and signal processing on each RF chain and provide measurement data about testing.

Using the test system and method in accordance with the invention, it now becomes possible to maintain accurate and repeatable performance of an ESM system. The antenna-containing structure disclosed herein may be a submarine, or another type of vessel or structure having an ESM system.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Prior to detailing the operation of the invention, it should be understood that just about any ESM system can be designed to implement an embedded distributed test system in accordance with the teachings of the invention. To with, existing systems can be retrofitted using the approaches specified herein. ESM applications range from military submarine periscopes, military aircraft or military satellites to wherever an RF receiver is used for signal processing.

Figure 1:
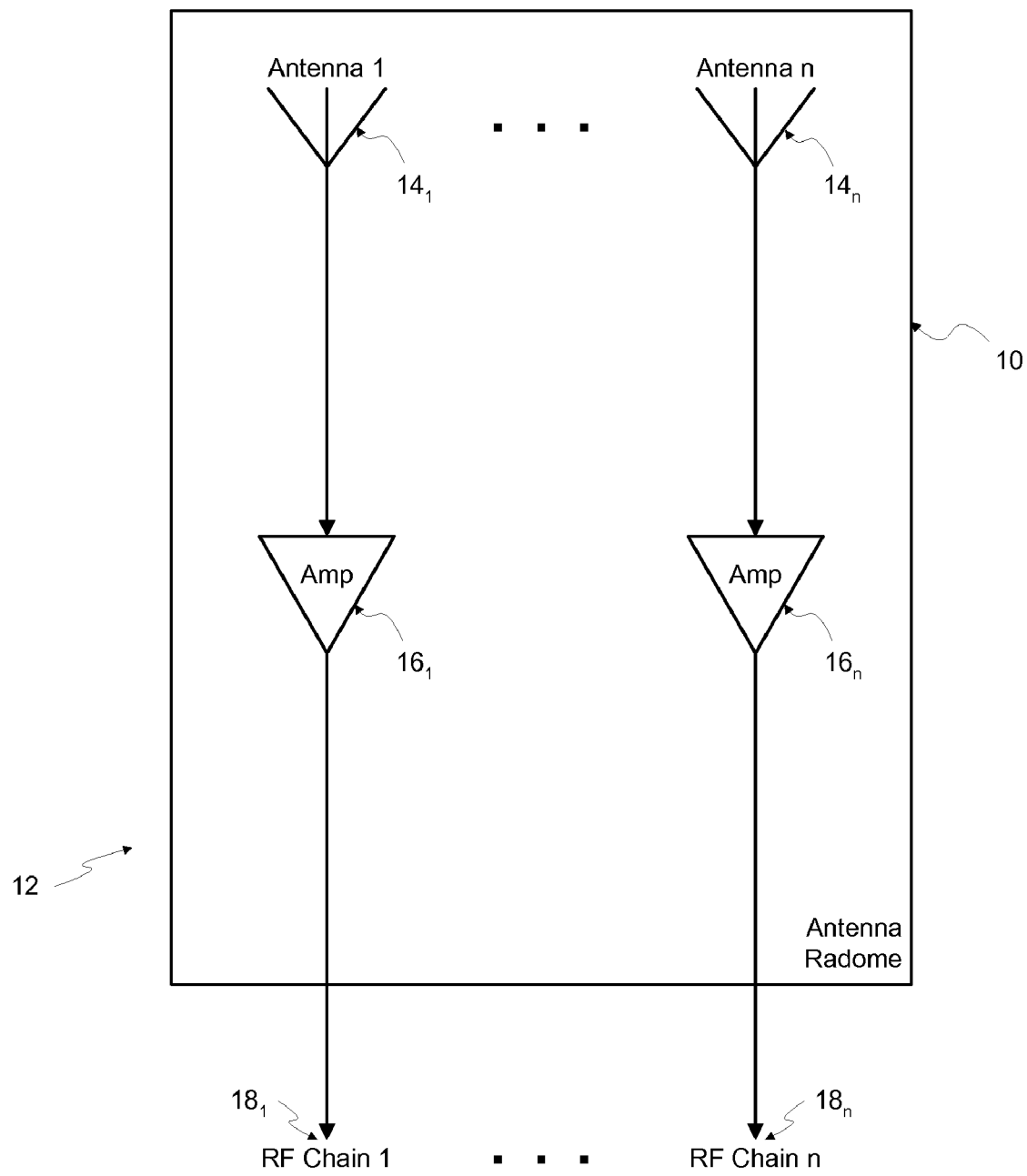
FIG. 1 shows an oversimplified ESM RF chain that includes antennas, amplifiers and RF distribution chains.

Referring to the drawings wherein like reference numerals refer to the same or similar elements, FIG. 1 shows an antenna radome 10 including a simplistic ESM RF chain 12 including at least one antenna $14_1, \ldots, 14_n$ (collectively designated as 14), a means of amplification $16_1, \ldots, 16_n$ (or amplifiers, collectively designated as 16) associated with each antenna 14 and an RF distribution chain $18_1, \ldots, 18_n$ (collectively designated as 18) associated with each amplifier 16. Most ESM systems implement a plurality of antenna systems each targeting specific frequencies of interest, and thus include multiple antennas 14, amplifiers 16 and distribution chains 18 as shown in FIG. 1. Under normal operation, the downlink RF chain 18 is uni-directional (one way) carrying RF signals from the antennas 14 in the antenna radome 10 to the signal processing elements 28 (see FIG. 3).

Figure 2:
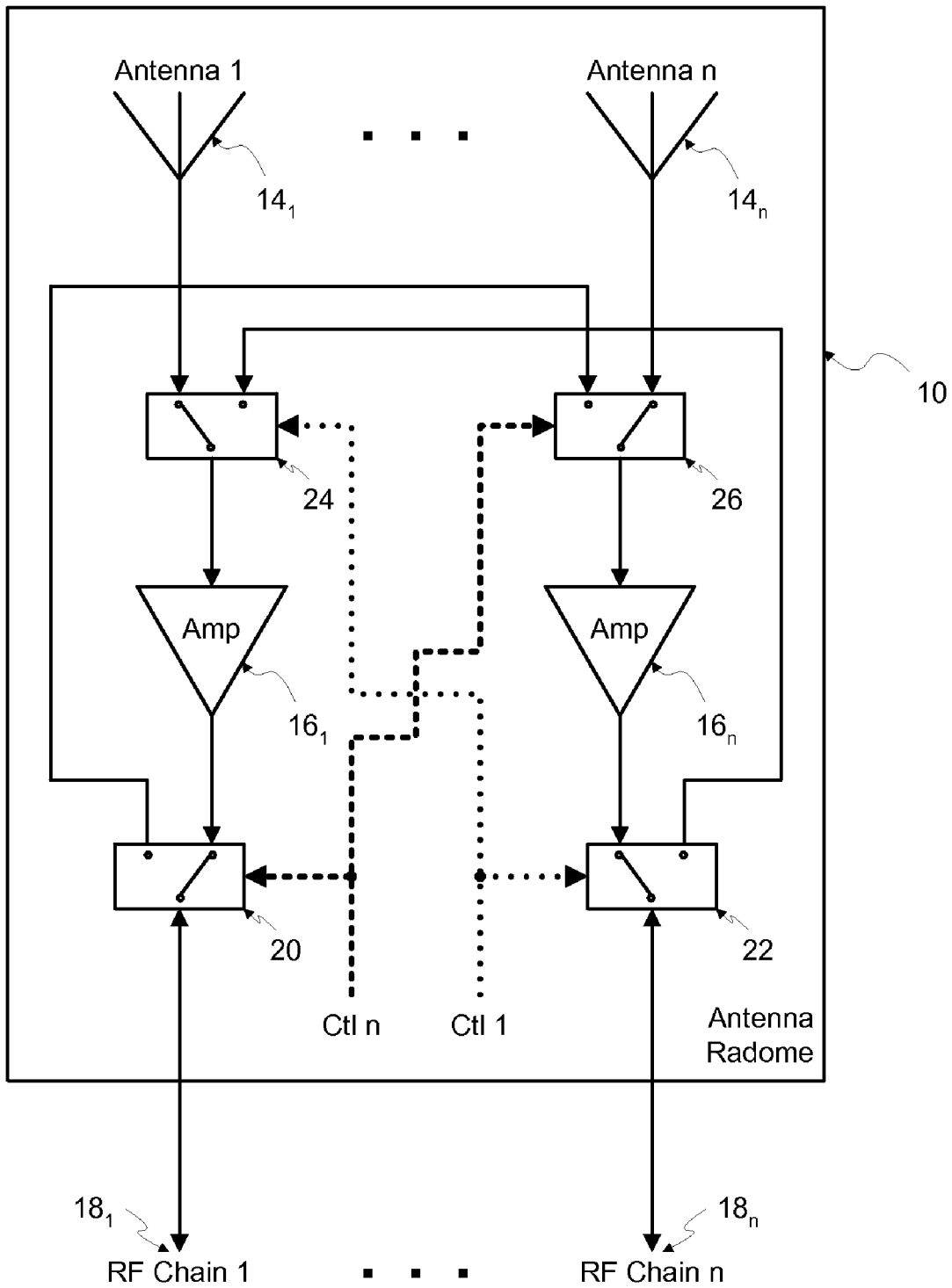
FIG. 2 shows a preferred embodiment of the manner for applying embedded antenna injection switching to the oversimplified ESM system shown in FIG. 1.

FIG. 2 shows one manner in which a plurality of RF downlink chains in the antenna radome 10 can be exploited to serve a secondary purpose within the distributed test system. Specifically, one (or more) of the downlink RF chains $18_1, \ldots, 18_n$ (collectively designated as 18) can be used in a bi-directional (two-way) manner to allow an RF test signal to be injected into the antenna radome 10 and return the signal on the antenna system under test. To this end, switching components are arranged in the antenna-containing structure including the antenna radome 10, or embedded therein.

Control of the embedded antenna switching can be accomplished in a number of ways. New designs can simply add dedicated control lines or buses for controlling the test system. ESM systems which require retrofit to implement a test system would need to work within the confines of an existing interface.

In one embodiment, not shown, bias tees are placed in the antenna radome 10. This approach, currently in use, allows a control voltage(s) to be sourced from somewhere close to the test signal generating arrangement, e.g., a programmable RF source, and enter a bias tee at that location. The bias tee allows the DC control voltage to be superimposed on the RF signal normally present on the RF chain. A companion bias tee would be located in the antenna radome 10 to strip the DC control voltage from the RF and apply it to the Ctl 1 ... Ctl n signals that control switches 20, 22, 24 and 26.

As shown in FIG. 2, SPDT switches 20, 22 are arranged near the end of the RF chains $18_1, 18_n$ and each is coupled to another SPDT switch 24, 26 between the antennas $14_1, 14_n$ and the amplifiers $16_1, 16_n$. The switches 20, 22, 24, 26 are coupled together so that one switch near the end of one of the RF chain is coupled to another switch between the antenna and amplifier of another RF chain. Instead of SPDT switches, other types of switching devices may be used. The coupling between switches may be effected through a controller of the switches without any direct physical connection between the switches.

FIG. 2 shows the position of the switches 20, 22, 24, 26 to allow for signals to travel from the antennas 14 to the RF downlink chains 18. When a test signal is to be directed through an RF chain 12, a control signal is applied to the switches (20 and 26, or 22 and 24) to change their position and enable a signal from the RF downlink chain 18 of this RF chain 12 to pass into the amplifier 16 of another RF chain 12. For example, control signal CTL n in FIG. 2 may be used to control switches 20, 26 (from the positions shown in FIG. 2) to enable a signal from RF chain $18_1$ to pass into amplifier $16_n$ and similarly, control signal CTL 1 may be used to control switches 22, 24 (from the positions shown in FIG. 2) to enable a signal from RF chain $18_n$ to pass into amplifier $16_1$.

Although only RF chains $18_1$ and $18_n$ are mentioned in the example, when multiple RF chains are present, signals from any one of the RF chains can be injected into any other RF chain.

In a preferred retrofit embodiment, a two-wire transmission system that provides both a power supply and data exchange function provides the control of the embedded antenna switching, i.e., generation and control of the control signals CTL, and is realized through the implementation of an industrial control network. Other control systems are also envisioned for use in the invention. In these embodiments, it is envisioned that bias tees would not be necessary and thus would not be used. The existing DC power supply lines are fed from and feed into a chipset that multiplexes DC and communications between control lines.

RF routing within the antenna radome 10 can be implemented in various ways. In a preferred embodiment, switches are used to provide high isolation between the injected test signals (the signals originating from a test signal generating arrangement such as the RF source 20, discussed more fully below, and directed onto a RF downlink chain 18 in a direction toward the antennas 14) and the normal antenna path signals (the signals originating from antennas 14). This prevents unintended radiation which could compromise the security of an ESM system. Isolation of the signals from the antennas 14 prevents interference with the test signals, so that only a test signal is directed to an amplifier 16 and not additionally a signal from the antenna 14 associated with the amplifier 16 on the RF chain 18. Alternative means of signal routing could include a mix of switches, splitters and couplers and is typically dependent on the particular system architecture.

Figure 3:
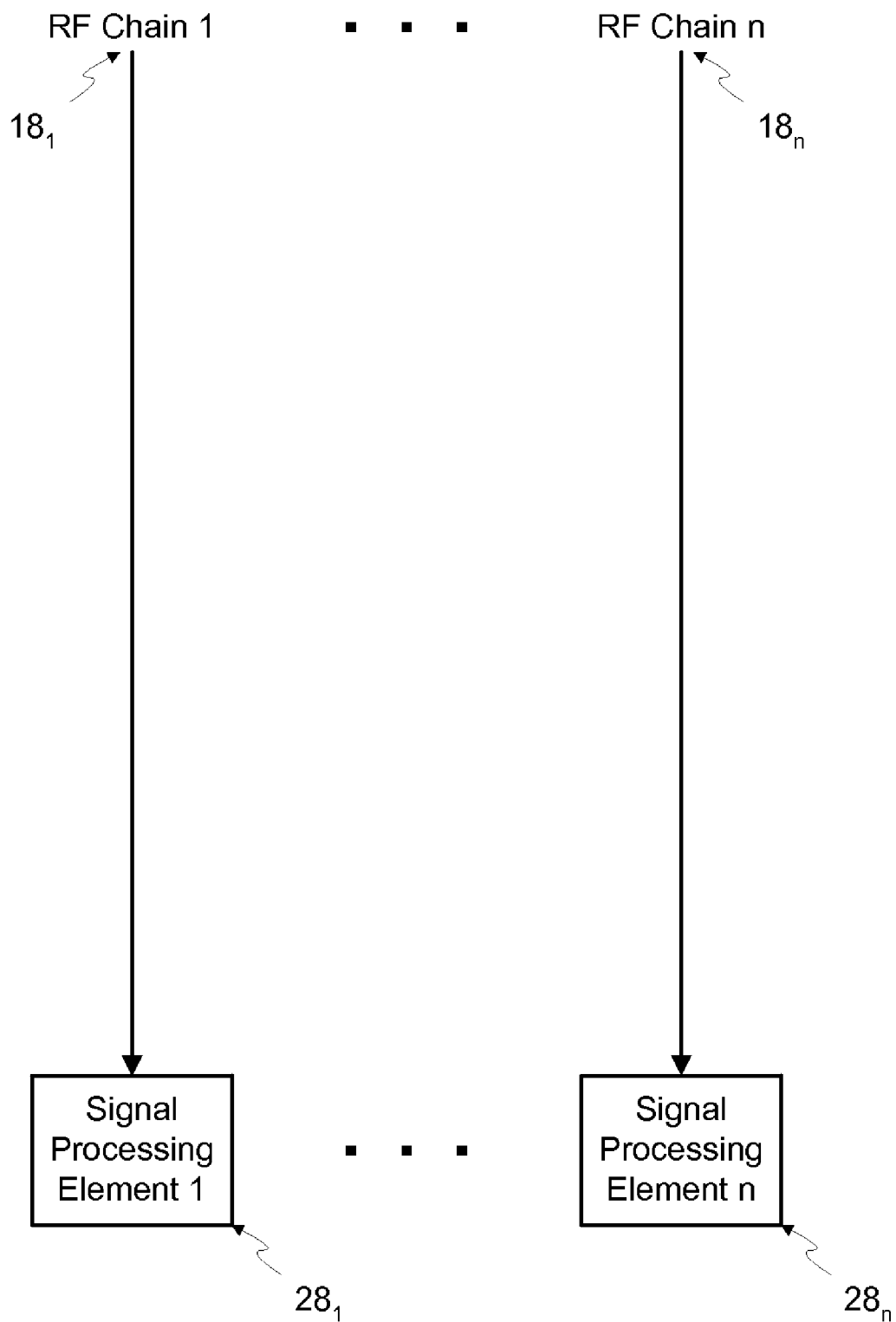
FIG. 3 shows an oversimplified routing of the signal output from an antenna radome to output of signal processing devices.

FIG. 3 shows the routing of the signal output from the antenna radome 10 (shown schematically in FIGS. 1 and 2) to the output of signal processing elements, components or devices $28_1, \ldots, 28_n$.

Figure 4:
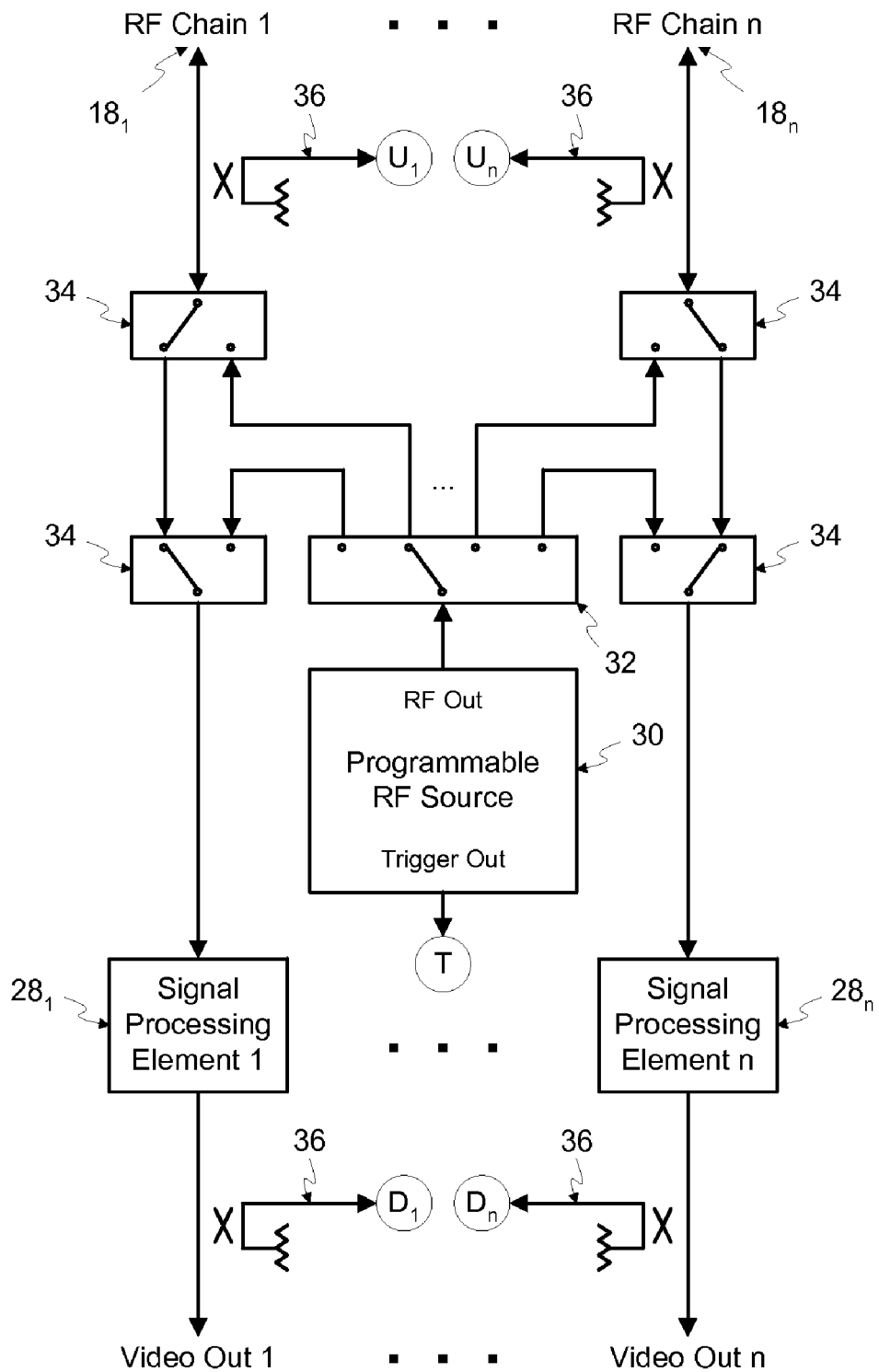
FIG. 4 shows a preferred embodiment of placement of an RF source with respect to the oversimplified ESM routing shown in FIG. 3 and its connection between the antenna radome and signal processing elements as well as general placement of RF sampling couplers.

Referring now to FIG. 4, placement of the test signal generating arrangement, i.e., a programmable RF source 30 in the illustrated embodiment, is system dependent. In a preferred embodiment, the RF source 30 is placed in a centrally located point or location that allows the RF source 30 to be switched into the upstream (towards the front end or antennas 14) end or downstream (towards the signal processing elements 28) end of the system, i.e., the RF source 30 is positioned such that both upstream and downstream testing of the entire ESM system is possible. Upstream testing is achieved by using one (or more) downlink RF chains to carry the RF signal from the programmable RF source 30 to inject in front of the antenna amplifier 16 of each RF chain 18 (see FIG. 2). Downstream testing is possible by routing the source into the signal processing elements $28_1, \ldots, 28_n$ of the ESM system.

One embodiment of an embedded programmable RF source 30 in accordance with the present invention preferably produces an output signal starting in the range from near DC. Near DC is preferred in contrast to true DC, which is unlikely to be practical or even desired as it will be of a low frequency compared to the upper frequency range of the systems involved. The output signal extends up through the EHF (extremely high frequency) band of the radio spectrum. The output of the programmable RF source 30 may be broken up such that the entire range is covered in multiple band segments. Band segments should correlate with the frequency band(s) used by the host ESM system, with each band segment having contiguous frequency coverage. Optional programmable output attenuators with the RF source 30 permit adjustment of the RF signal level. An internal lookup table, or comparable technique, may be used to provide level compensation and normalization across the covered frequency spectrum.

When operated in a CW (continuous wave) mode, the programmable RF source output(s) can be tuned to a specified frequency. The RF source 30 provides a trigger output that indicates when the RF output has completed tuning and settled at the programmed frequency. The programmable RF source 30 can mimic a swept RF source by iteratively incrementing or decrementing in frequency across an entire frequency band segment or any designated portion thereof. The use of the programmable RF source 30 in this manner permits the implementation of an insertion loss $S_{21}$ measurement function when used in conjunction with a swept tuned measurement receiver covering the same frequency band, discussed below.

In one embodiment, the programmable RF source 30 has pulse width modulation (PWM) capabilities such that the signal processing end of the ESM system can use the source for BIT recognition of known frequency and PW/PRI parameters. When the programmable RF source 30 is operated with pulse width modulation at a fixed frequency, the aforementioned trigger output produces a signal which coincides with the pulse modulation. Use of the programmable RF source 30 in this mode permits the implementation of a Tangential System Sensitivity (TSS) measurement function when used in conjunction with a time domain digitizer, discussed below.

Since the system likely includes a plurality of RF chains $18_1, \ldots, 18_n$, a preferred embodiment includes a sufficient number of components to allow switching of the RF source 30 into either the upstream or downstream direction on all RF chains $18_1, \ldots, 18_n$. These components may include various switches 32 and 34, or other types of RF switching components. The uppermost switches 34 along with switch 32 are used to inject test signals into the RF chains 18 in the upstream direction, i.e., a direction toward the antennas 14 and away from the signal processing elements 28. The lowermost switches 34 along with switch 32 are used to inject test signals into the RF chains 18 in the downstream direction, i.e., a direction toward the signal processing elements 28 and away from the antennas 14. It is possible for a distributed test system and method in accordance with the invention to include a test signal generating arrangement in a position, or with a switching arrangement having a particular configuration, to allow for only upstream testing or only downstream testing.

Placement of RF couplers 36 for signal monitoring is also system dependent. In a preferred embodiment, RF couplers 36 would be placed on most if not all downlink RF chains $18_1, \ldots, 18_n$. Various distribution schemes and system architecture will dictate the placement of additional sampling devices (not shown) depending on signal type, frequency and location. It is possible that there is considerable distance between the antenna radome 10 and the closest RF couplers 36, for example, at least about 50 feet, since the RF couplers 36 and the remaining components of the distribution or downlink segment of the RF chains 12 can be separated from the antenna radome. When the antenna-containing structure is a submarine, the antenna radome would be in one part of the submarine while the test signal generating arrangement and monitoring arrangement would be in another part of the submarine.

The embedded RF couplers 36 in accordance with the present invention permit sampling of signals at various points within the ESM system, with monitoring of the signals being possible based on the sampled signals. The couplers 36 may cover a narrow frequency band segment and/or a broad range of frequency band segments as dictated by system requirements. The couplers 36 may be implemented as a bank (group) and/or distributed throughout the system as system requirements dictate.

Figure 5:
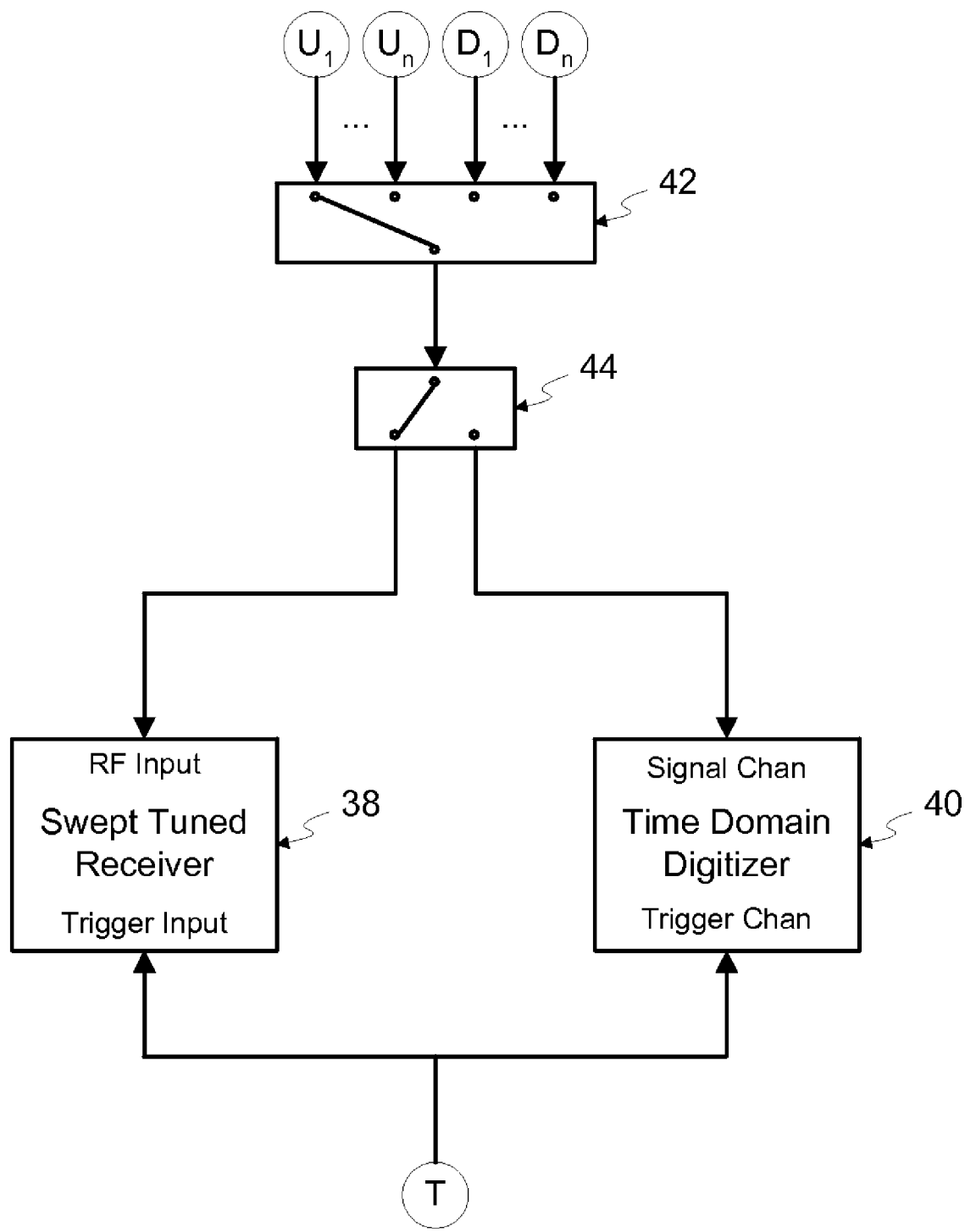
FIG. 5 shows a preferred embodiment of the switching arrangement for routing output of RF sampling couplers, shown in the system of FIG. 4, to measurement instruments.

The switching between the plurality of embedded couplers 36 in accordance with the present invention is preferably used to route multiple signals into either the swept tuned measurement receiver 38 or the time domain digitizer 40 (see FIG. 5). The size of this switching network is dependent on the number of downlink RF chains 12 with the particular ESM system and the breakdown of frequency band segments, signal processing architecture, etc.

The ability to switch all monitored points into either the swept tuned measurement receiver 38 or the time domain digitizer 40 must be scaled to match the system specific implementation. Switches 42, 44 can be used for this purpose. The switching network of RF couplers 36, switches 42 and 44 is controlled by a system processor 46 (see FIG. 6) to direct signals from the RF couplers 36 as desired into either the swept tuned measurement receiver 38 or the time domain digitizer 40.

The swept tuned measurement receiver 38 in accordance with the present invention is preferably used to provide amplitude vs. frequency measurement information to the system processor. The measurement receiver 38 provides for frequency coverage to the maximum frequency output afforded by the RF source 30 and down to a frequency of about 100 Hz or less. The measurement receiver 38 can accept signal levels ranging from about −130 dBm or less to about +30 dBm. One or more optional pre-amplifiers can be used to extend the measurement of low level signals even further.

The swept tuned measurement receiver 38 preferably includes a range of programmable resolution and video bandwidth settings as well as an averaging function to allow accurate measurement of signals within a noisy environment. A trigger input may be included to allow the measurement sweep to be triggered by output of the programmable RF source 30 to synchronize and speed up insertion loss measurements. The swept tuned measurement receiver 38 may also be used as a stand alone device for performing spectral analysis of received signals and/or for troubleshooting problems within the ESM system.

Figure 6:
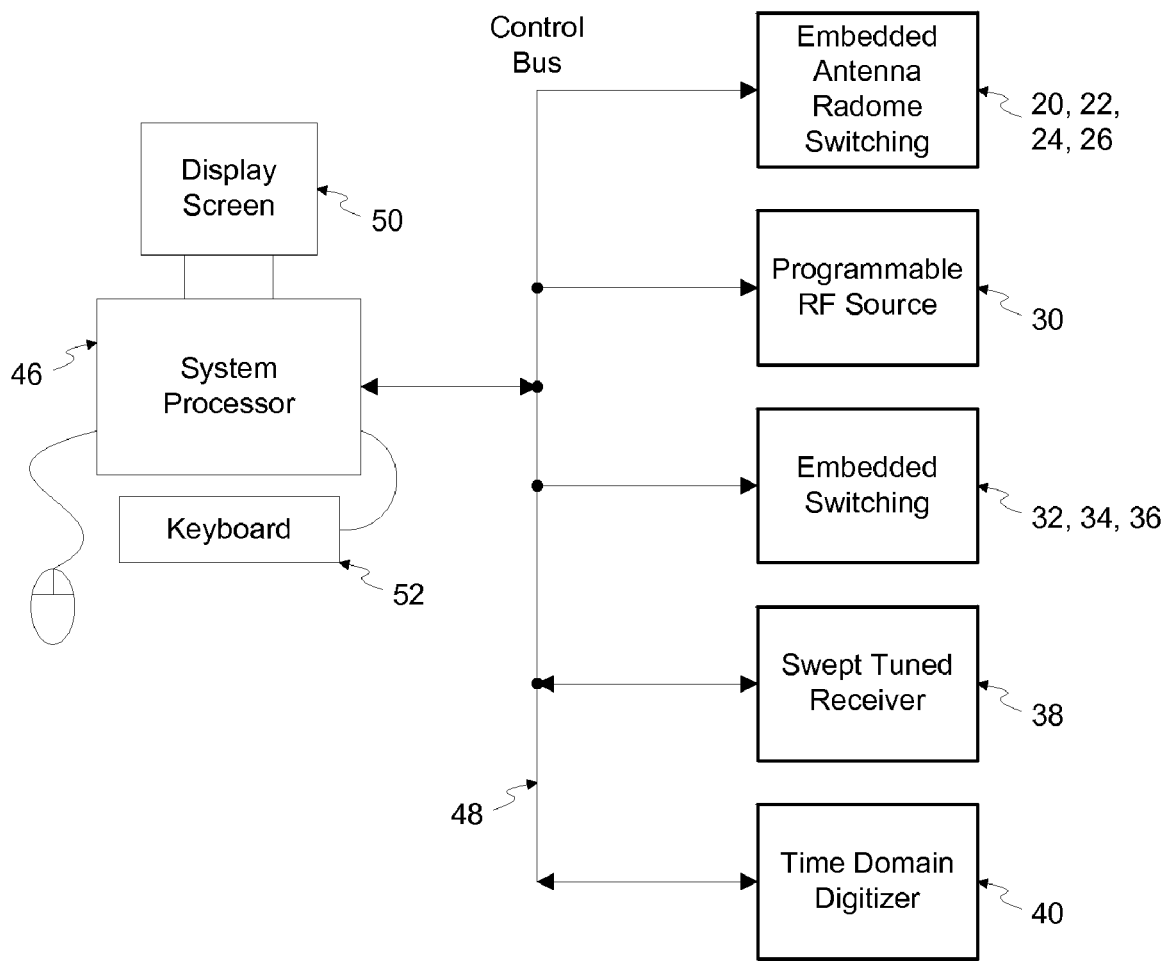
FIG. 6 shows a preferred embodiment of how a distributed test system in accordance with the invention can be controlled.

The time domain digitizer 40 in accordance with the present invention is preferably used to provide amplitude vs. time measurement information to the system processor, 46 in FIG. 6. The digitizer 40 may be structured to provide a programmable sampling rate as low as about 100 S/sec to in excess of about 100 MS/sec. The digitizer 40 preferably has a minimum of two independent channels each offering a minimum of 8-bit resolution. Virtually any number of channels can be provided and used.

The time domain digitizer 40 also preferably includes an averaging function to allow accurate measurement of signals within a noisy environment. A trigger input is included to allow the measurement sweep to be triggered by output of the programmable RF source 30. This permits the synchronization of the sweep with the pulse width modulation in order to effect a TSS measurement within the applicable portions of the ESM system. The time domain digitizer 40 may also be used as a stand alone device for troubleshooting problems within the ESM system.

Instead of both the measurement receiver 38 and the time domain digitizer 40, only a single one of these components may be provided. Also, alternative components can be provided which are capable of conducting measurements on sampled, RF signals. Data from the measurement receiver 38 and time domain digitizer 40 is directed to the system processor 46 for analysis and presentation on screen 50 (see FIG. 6).

FIG. 6 shows a preferred embodiment wherein control of the distributed test system may be accomplished by a single system processor 46 via a wired Ethernet/LAN (local area network) communication bus 48 allowing the distributed elements to be strategically placed at various points in the ESM system without stringent limits on the distance between elements. System processor 46 may be the processor of a computer having a display screen 50 and keyboard 52. Alternate means of communication between the control unit and the distributed elements might include serial (RS-232, RS-485, etc.), parallel (GPIB, MXI, etc.), RF (Bluetooth, Wi-Fi, etc.), optical (IR, fiber-optic, etc.) or any combination thereof. The wired LAN approach also allows operation in a noisy environment and without the security concerns of a wireless approach. Multiple, yet coupled processors may also be used to control different components of the invention, i.e., a single processor is a preferred but not exclusionary embodiment.

When a single system processor 46 is provided, the system processor 46 in accordance with the present invention is preferably used to provide coordination of all processes and evaluate measurement data. The system processor 46 contains the necessary communications interface and initiates all communication within the distributed test system. The system processor 46 is capable of controlling each portion of the distributed test system in an automated fashion. For troubleshooting purposes, each portion of the test system can also be manually and independently controlled via a virtual graphical user interface (GUI).

The system processor 46 also preferably includes algorithms for performing insertion loss and TSS measurements. Each applicable path would have stored upper and lower window data associated to evaluate performance. The system processor 46 should be capable of mining stored data to perform functions such as trend analysis and characterization. The inherent ability to control the test system over long distances using appropriate interfacing is also possible allowing remote distance support of the ESM system.

Figure 7:
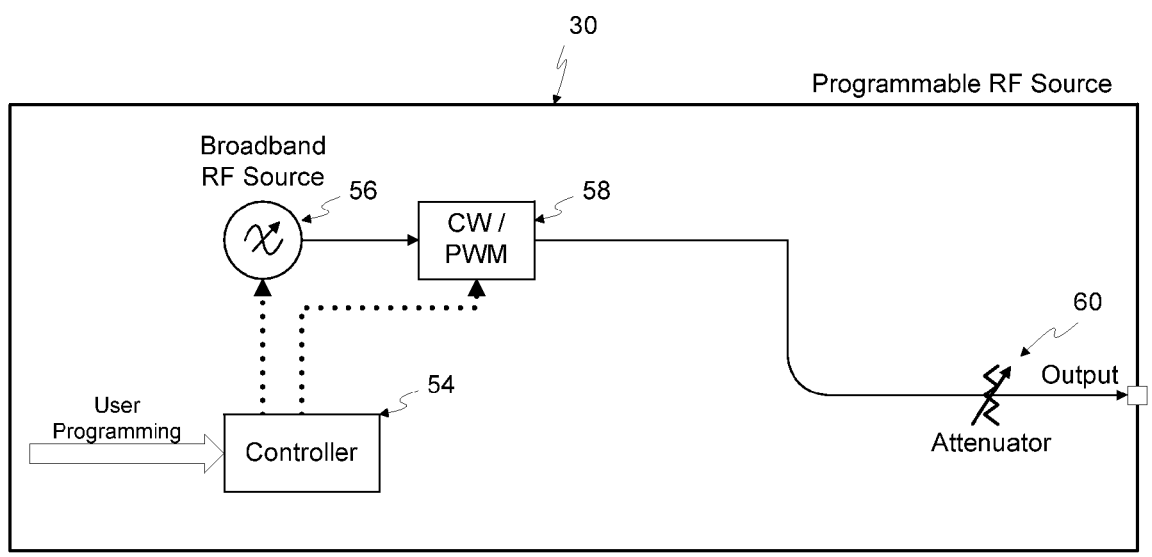
FIG. 7 shows a preferred embodiment of a programmable RF source for use in the invention.

FIG. 7 shows a representative embodiment of the programmable RF source 30 shown in FIG. 4, it being understood that the RF source 30 can be implemented in alternative ways, all of which are encompassed within the scope and spirit of the invention. The RF source 30 includes a user-programmable controller 54 which controls a broadband RF source 56 and a CW/PWM modulator 58, an attenuator 60 for attenuating the output signal from the CW/PWM modulator 58 and providing it to an output, e.g., an output port.

Figure 8A:
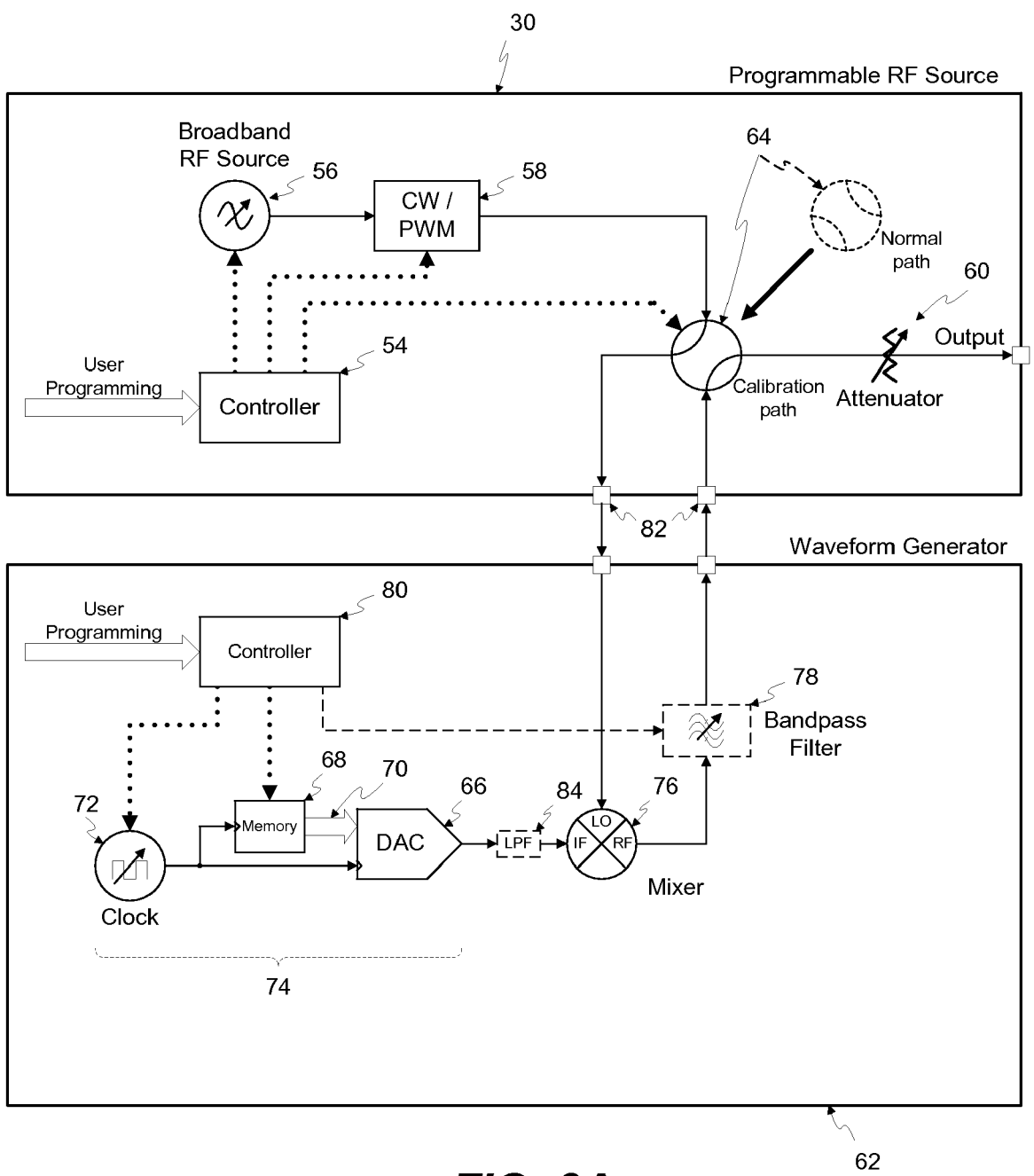
FIG. 8A shows a preferred embodiment of how the programmable RF source shown in FIG. 7 may be modified to permit generation of ESM calibration waveforms in accordance with the invention.

The RF source shown in FIG. 7 may be modified in accordance with the invention to enable generation of calibration signals for use with the ESM signal processing elements 28. To this end, as shown in FIG. 8A, a waveform generator assembly 62 is connected to the RF source 30 and a transfer switch 64 is arranged in the RF source 30, interposed between the CW/PWM modulator 58 and the attenuator 60. In one calibration configuration of the transfer switch 64, the output signal from the CW/PWM modulator 58 is routed to the attenuator 60 (this "normal" configuration being shown in dotted lined in FIG. 8A). In this case, a CW or PWM carrier can be applied to the ESM system. Transfer switch 64 is a known electronic component which is sometimes referred to as a baseball switch.

In another configuration of the transfer switch 64, shown in solid lines in FIG. 8A, the signals from the broadband RF source 30 are routed out to the waveform generator assembly 62 for purposes of producing a calibration signal via, for example, direct-IF upconversion.

The waveform generator assembly 62 includes one or more high-speed digital-to-analog converters (DAC) 66 and a respective number of high-speed memories 68 from which data is fed to the DAC(s) 66 via a data bus 70 (FIG. 8A showing only a single DAC 66 and a single high speed memory 68). Each DAC 66 may have a minimum of 8 bits of resolution. Each memory 68 could be implemented such that upon application of power, the memory 68 would need to be loaded with data to make the waveform generator assembly 62 operational, and upon removal of power, any data would be lost, leaving the unit in an unclassified state. For example, the memory may be volatile static RAM.

Both the DAC 66 and high speed memory 68 can be fed from a clock 72 that could be either fixed or programmable in nature. The memory clock and DAC clock may be multiples or sub-multiples of each other depending on the implementation of the hardware and whether or not data multiplexing is used. The DAC 66, memory 68 and clock 72 form a simplistic arbitrary waveform generator (AWG) 74 capable of producing a baseband waveform limited in bandwidth by sample clock rate and ESM requirements.

The baseband waveform produced by the waveform generator 74 is fed through a low pass filter 84 and into mixer 76 of the waveform generator assembly 62 on the intermediate frequency (IF) port thereof. For calibration purposes, it may be advantageous to use the raw output from waveform generator 74 and eliminate low pass filter 84. The signal from the CW/PWM modulator 58 of the programmable RF source 30 is fed into the LO port of the mixer 76 and acts as a local oscillator (LO). The resultant signal produced at the RF port of the mixer 76 would be a modulated carrier within the usable frequency range of the ESM system. The carrier frequency is dependent on the frequency setting of the programmable RF source 30 at the LO port and the data presented to the DAC 66 from memory 68. The bandwidth of the modulated carrier would be dependent upon the sampling rate of the DAC clock and the nature of the data being presented to the DAC 66 from memory 68.

The heterodyning (i.e., mixing or beating) of the IF signal from the DAC 66 and the LO signal from the programmable RF source 30 produces the desired carrier frequency as well as an image frequency and assorted mixer products. Typically mixer outputs are filtered to remove unwanted signals. The output of the mixer 76 could utilize a frequency agile bandpass filter 78 as shown in FIG. 8A to remove the unwanted signals.

A user-programmable controller 80 controls the DAC 66, memory 68 and filter 78.

For calibration purposes, it may be advantageous to use the raw output from the mixer 76 provided the image frequency and mixer products fall outside of the channel bandwidth of the ESM system in use. When the bandpass filter 78 is not required for a particular ESM system, an alternate embodiment might include the mixer as part of the programmable RF source 30 to reduce both the number of high frequency external connections and insertion loss resulting from the shorter and simplified path.

Although the RF source 30 and waveform generator assembly 62 are shown in separate boxes in FIG. 8A, this has no bearing on the relative arrangement and housing of these components. The RF source 30 and waveform generator assembly 62 may be housed in a common housing or in separate housings (as represented in FIG. 8A). Separate housings could enable better placement and fit of the components within a test and performance monitoring system in accordance with the invention. Moreover, when separate housings are used, the waveform generator assembly 62 may be an optional component in some embodiments and thus easier to eliminate. However, to enable possible use with a waveform generator assembly 62, the housing of the RF source 30 would still be provided with connections 82 as shown in FIG. 8A.

Figure 8B:
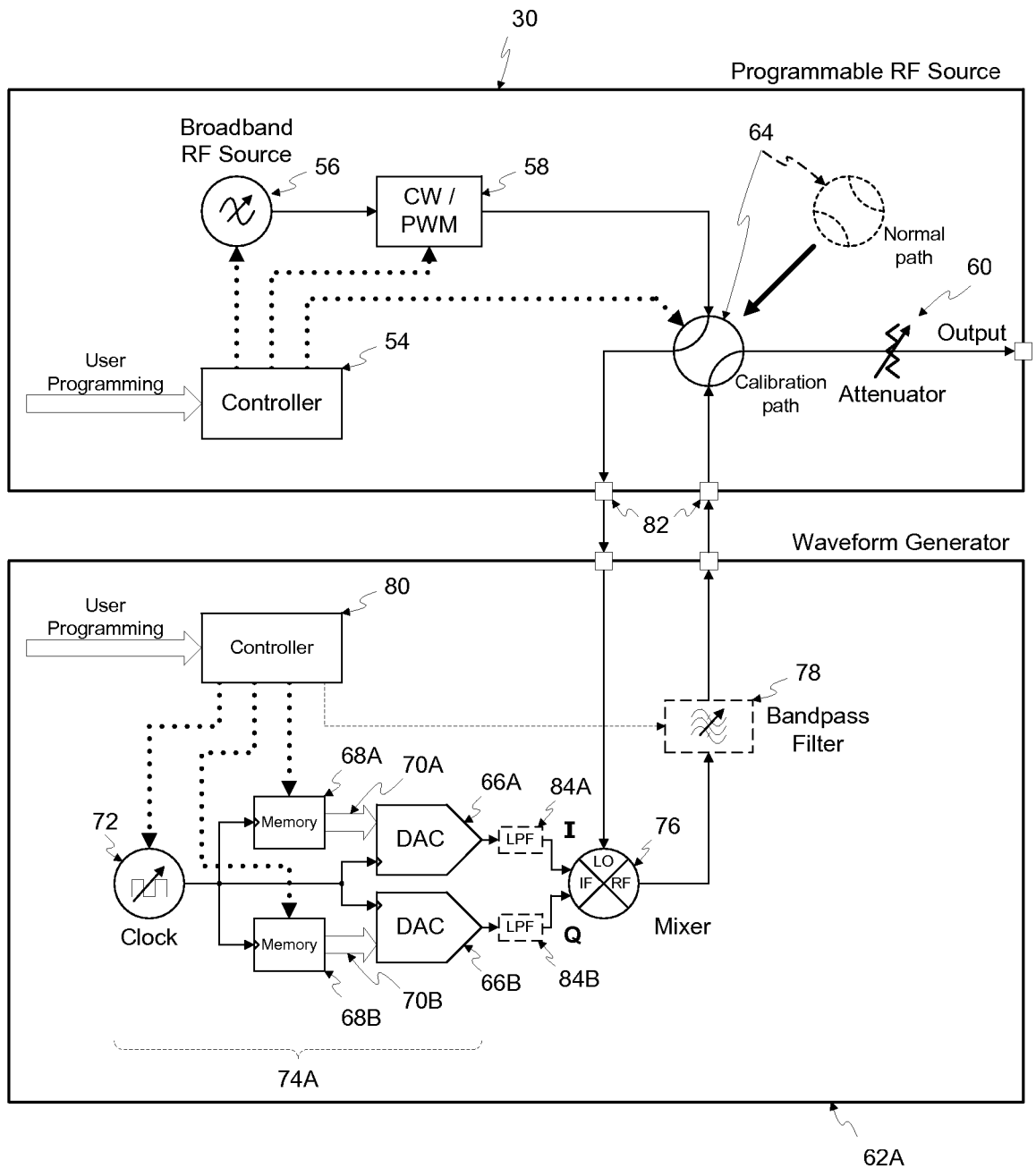
FIG. 8B shows another preferred embodiment of how the programmable RF source shown in FIG. 7 may be modified to permit generation of ESM calibration waveforms in accordance with the invention.

FIG. 8B shows another modification of the RF source shown in FIG. 7 to enable generation of calibration signals for use with the ESM signal processing elements 28. In this embodiment, the same modified RF source 30 is used as in the embodiment shown in FIG. 8A, i.e., to include the transfer switch 64. A waveform generator assembly 62A is connected to the connections 82 of the RF source 30.

Waveform generator assembly 62A includes a plurality of DACs 66A, 66B feed with data from a respective high speed memories 68A, 68B via a respective data buses 70A, 70B. The DACs 66A, 66B and high speed memories 68A, 68B can be fed from a clock 72 that could be either fixed or programmable in nature. The memory clock and DAC clock may be multiples or sub-multiples of each other depending on the implementation of the hardware and whether or not data multiplexing is used. The DACs 66A, 66B, memories 68A, 68B and clock 72 form a parallel pair of simplistic arbitrary waveform generators (AWG) 74A capable of producing baseband waveforms limited in bandwidth by sample clock rate and ESM requirements.

Differing from the embodiment shown in FIG. 8A, this embodiment utilizes a vector modulator approach using an in-phase channel (I) and quadrature channel (Q), thus adding a orthogonal quadrature channel. Varying the amplitude and polarity of both the I and Q channels produces a vector (hence vector modulation) which can vary from 0 degrees to 360 degrees. To this end, the output of the DAC 66A is passed through a low pass filter (LPF) 84A to provide the I component of the vector while the output of DAC 66B is also passed through a low pass filter (LPF) 84B to provide the Q component of the vector. For calibration purposes, it may be advantageous to use the raw output from DACs 66A, 66B and eliminate low pass filters 84A, 84B. The I/Q vector modulator allows various types of modulation to be simulated. In contrast, the embodiment of FIG. 8A uses only the I channel, i.e., when the Q channel is not needed, the I portion could still be used in the manner described above with reference to FIG. 8A since it is not phase-shifted and can stand alone.

As illustrated in the earlier 8A embodiment, a user-programmable controller 80 controls the DACs 66A, 66B, memories 68A, 68B and filter 78. As was the case with the earlier embodiment, if it is advantageous to use the raw output from the mixer 76, bandpass filter 78 may be eliminated and simplified in the same manner.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A test system for testing electronic surveillance monitoring systems, comprising:
an antenna-containing structure including an antenna radome, at least one RF chain including an antenna, an amplifier and a signal processing element arranged to receive signals from said antenna through said amplifier, said antenna and said amplifier being housed in said antenna radome;
a test signal generating arrangement at least partially arranged in said antenna-containing structure for generating test signals;
a switching arrangement arranged in said antenna-containing structure for selectively enabling signals received by said antenna of said at least one RF chain to be directed to said signal processing element of said at least one RF chain and enabling test signals generated by said test signal generating arrangement to be injected into said at least one RF chain at a location within said antenna radome; and
a control system coupled to said test signal generating arrangement and said switching arrangement for controlling said test signal generating arrangement and said switching arrangement to cause test signals from said test signal generating arrangement to be injected into said at least one RF chain at the location within said antenna radome.

2. The system of claim 1, wherein said at least one RF chain comprises a plurality of RF chains, each including an antenna, an amplifier and a signal processing element arranged to receive signals from said antenna through said amplifier.

3. The system of claim 1, wherein said switching arrangement is arranged to inject the test signals into said at least one RF chain in advance of said amplifier in a signal flow path from said antenna to said signal processing element of said at least one RF chain.

4. The system of claim 1, wherein said switching arrangement comprises a plurality of switches arranged in said at least one RF chain.

5. The system of claim 1, wherein said at least one RF chain comprises first and second RF chains, each including an antenna, an amplifier and a signal processing element arranged to receive signals from said antenna through said amplifier, said switching arrangement comprising a first switch arranged near an end of each of said first and second chains within said antenna radome and a second switch arranged between said antenna and said amplifier of each of said first and second RF chains within said antenna radome, said first switch of said first RF chain being coupled to said second switch of said second RF chain to enable a signal from said test signal generating arrangement on said first RF chain to be directed to said amplifier of said second RF chain and said first switch of said second RF chain being coupled to said first switch of said second RF chain to enable a signal from said test signal generating arrangement on said second RF chain to be directed to said amplifier of said first RF chain, said control system being arranged to control said first and second switches.

6. The system of claim 1, wherein test signal generating arrangement comprises a programmable RF source.

7. The system of claim 6, further comprising an RF switching arrangement coupled to said RF source and said at least one RF chain to enable signals from said RF source to be directed onto said at least one RF chain in a direction toward said antenna of said at least one chain and away from said signal processing element of said at least one RF chain.

8. The system of claim 6, further comprising a waveform generator assembly coupled to or integrated with said RF source and RF switching arrangement, said RF source including a broadband RF source, a transfer switch and an output, said transfer switch having a first position in which signals from said broadband RF source are directed to said waveform generator assembly and a second position in which signals from said broadband RF source are directed to said output without passing through said waveform generator assembly, said waveform generator assembly including at least one digital-to-analog converter (DAC), at least one memory from which data is fed to a respective one of said at least one DAC, a clock for providing clock signals to said at least one DAC and said at least one memory, and a mixer for receiving signals from said broadband RF source and said at least one DAC and outputting a modulated carrier signal which is directed to said output of said RF source.

9. The system of claim 1, wherein said test signal generating arrangement comprises a programmable RF source entirely embedded in said antenna radome.

10. The system of claim 1, further comprising a monitoring arrangement for monitoring signals on said at least one RF chain, said monitoring arrangement being arranged partly in said antenna-containing structure.

11. The system of claim 10, wherein said monitoring arrangement includes RF couplers and/or switches associated with each of said at least one chain and arranged in said antenna radome, a swept tuned measurement receiver and a time domain digitizer and an RF switching arrangement for switching between said RF couplers to direct measurement signals from said RF couplers to said swept tuned measurement receiver and said time domain digitizer.

12. The system of claim 11, wherein said control system comprises a system processor coupled to said switching arrangement, said test signal generating arrangement, said RF switching arrangement, said measurement receiver and said time domain digitizer, said system processor being arranged to coordinate testing and signal processing on said at least one RF chain and provide measurement data about testing.

13. A method for testing electronic surveillance monitoring systems including an antenna-containing structure including an antenna radome, at least one RF chain including an antenna, an amplifier and a signal processing element arranged to receive signals from the antenna through the amplifier, comprising:
arranging a test signal generating arrangement at least partially in the antenna-containing structure;
generating test signals by means of the test signal generating arrangement; and
directing the test signals into the at least one RF chain within the antenna radome.

14. The method of claim 13, further comprising:
arranging a switching arrangement in the antenna-containing structure for selectively enabling signals received by the antenna of the at least one RF chain to be directed to the signal processing element of the at least one RF chain and enabling test signals generated by the test signal generating arrangement to be directed into the at least one RF chain; and
controlling the test signal generating arrangement and the switching arrangement to alternately cause the amplifier of the at least one RF chain to receive signals from the antenna or receive test signals from the test signal generating arrangement.

15. The method of claim 13, wherein the test signals are directed into the at least one RF chain in advance of the amplifier in a signal flow path from the antenna to the signal processing element of the at least one RF chain.

16. The method of claim 13, wherein the at least one RF chain comprises a plurality of RF chains, further comprising:
arranging switches in the RF chains; and
controlling the switches to cause test signals on a first RF chain to be directed into an amplifier of a second RF chain while isolating the antenna of the second RF chain from the amplifier of the second RF chain.

17. The method of claim 13, wherein the test signal generating arrangement comprises a programmable RF source, further comprising:
coupling an RF switching arrangement to the RF source and the at least one RF chain; and
controlling the RF switching arrangement to enable signals from the RF source to be directed onto the at least one RF chain in a direction toward the signal processing element of the at least one chain and away from the antenna of the at least one RF chain.

18. The method of claim 13, further comprising monitoring signals on the at least one RF chain by means of a monitoring arrangement arranged partly in the antenna radome.

19. The method of claim 18, wherein the monitoring arrangement includes RF couplers and/or switches associated with each of the at least one chain and arranged in the antenna radome, a swept tuned measurement receiver and a time domain digitizer, further comprising arranging an RF switching arrangement to switch between the RF couplers to direct measurement signals from the RF couplers to the swept tuned measurement receiver and the time domain digitizer.

20. The method of claim 19, further comprising coupling a system processor to the switching arrangement, the test signal generating arrangement, the RF switching arrangement, the measurement receiver and the time domain digitizer, the system processor being arranged to coordinate testing and signal processing on the at least one RF chain and provide measurement data about testing.

* * * * *